UNITED STATES PATENT OFFICE.

ROBERT A. FISHER, OF PHILADELPHIA, PENNSYLVANIA.

MANUFACTURE OF AN ALUMINOUS SIZING MATERIAL FOR PAPER-MAKERS' USE.

SPECIFICATION forming part of Letters Patent No. 321,094, dated June 30, 1885.

Application filed May 1, 1885. (No specimens.)

*To all whom it may concern:*

Be it known that I, ROBERT A. FISHER, of the city and county of Philadelphia, State of Pennsylvania, have invented a new and useful Improvement in the Manufacture of an Aluminous Sizing Material for Paper-Makers' Use, of which the following is a full, clear, and exact specification.

The aluminous materials used by paper-makers in the "sizing-engine" differ widely, and the kind and quality of the same that can be advantageously employed depends upon the kind and quality of the paper to be made.

To make low grades of paper, the presence of iron in an aluminous sizing material is not greatly objectionable; but in paper of high grades it is desirable to use a sizing material free from iron.

The object of my invention is to produce from any solution of sulphate of alumina containing iron a sizing material free from iron having a porous structure, whereby (because of the large amount of surface exposed) the material is rapidly soluble in water.

My invention does not claim anything new in the method of preparing the solution of sulphate of alumina. I treat bauxite, alum-clay, or any other suitable aluminous compound containing iron with sulphuric acid, according to the usual method followed for the particular aluminous material by those who practice the alum-making art. After the chemical reaction between the alum-clay and acid has ceased, I add a sufficient quantity of water to prevent the mass from becoming hard when cold. There is thus obtained a liquid muddled by the presence of silica and other insoluble matters. The next step in the process is to remove the iron. For this purpose I add either to the above muddled solution or to the clear liquid obtained by removing the insoluble matter a quantity of yellow prussiate of potash, the quantity used to be regulated by the amount of iron present in the ferruginous aluminous solution—say, for each one per cent. of peroxide of iron in the solution four per cent. (more or less) of yellow prussiate of potash; but the exact quantity required must be determined by experiment. Considerable excess of yellow prussiate of potash should be avoided; but even with only a slight excess (which is desirable in order to remove all the iron) it will be found that after separation of the greater part of the iron (in the form of insoluble Prussian blue) a small quantity of soluble Prussian blue will remain in the aluminous solution, thereby imparting to the same a pale-blue color. To remove this after addition of the required amount of yellow prussiate of potash, I add a small quantity of metallic zinc or zinc oxide, or carbonate or silicate of zinc or zinc "blende," or any other natural or artificial compound of zinc that will precipitate the last trace of soluble prussiate of iron, ("Prussian blue,") and thus produce an aluminous liquid free from iron, and therefore colorless. The quantity of metallic zinc or of a compound of zinc required to remove the soluble Prussian blue and the excess of prussiate of potash is small but variable, depending upon the greater or less excess of yellow prussiate that has been used. If oxide of zinc is to be used for the purpose, one ounce (more or less) to every six ounces of yellow prussiate of potash used would be about the quantity of oxide of zinc required. The next step in my process is to remove by subsidence or otherwise the Prussian blue and other insoluble matter. The aluminous solution having been thus freed from iron, the next step is to produce from such aluminous solution a solid substance permeated by pores or vesicules. The "clear" liquor is therefore concentrated in a suitable evaporator to a density of about 65° Baumé. The hot liquid is then to be cooled, with or without stirring, until it becomes viscid, when two pounds (more or less) of bicarbonate of soda to one thousand of the white porous substance to be produced are sprinkled upon the surface of the viscid mass and rapidly stirred into it. When thoroughly mixed and sufficiently cool, it is to be discharged into a suitable receptacle to harden. The mass is afterward broken up into lumps of the desired size.

The porous or vesicular structure may be produced by adding to the hot viscid mass aforesaid bicarbonate of soda, potassa, lime, or other alkali or alkaline earth, or the carbonate or bicarbonate of some other base, or by any sulphide, sulphite, or other compound which will set free an acid, vapor, or gas, so that the same in the act of escaping will inflate the mass and render it frothy while in the act of cooling and hardening, whereby it becomes full of pores and vesicles. A like porous or vesicular structure may be obtained by the rapid injection of air, steam, vapor of water, or any gaseous body into the hot viscid mass aforesaid; but I prefer to use the bicarbonate of an alkali or alkaline earth.

I am aware that Henry Pemberton, of Allegheny City, State of Pennsylvania, has patented a process, No. 82,747, for producing porosity in a hot viscid solution of pure sulphate of alumina made from pure hydrated alumina.

I am also aware that George T. Lewis and Carl V. Petraeus have patented a process, No. 240,597, for the "manufacture of aluminous cakes" free from iron, from ferruginous aluminous solutions.

My invention is to obtain directly from any alum-clay or other suitable aluminous mineral containing iron a product having a porous or vesicular structure free from iron, and containing little, if any, zinc, thus avoiding the loss of time incident to the production of the ordinary aluminous cake, which, because of its hardness and the closeness of its structure, can be made sufficiently soluble in water only by grinding into powder. By putting the sulphate of alumina into the porous condition I am enabled within an hour after the solution has been sufficiently concentrated to produce at considerably less expense a merchantable article of superior quality.

Having thus fully described my process, what I claim as new, and desire to secure by Letters Patent, is—

1. The process herein described of manufacturing a porous material for paper-makers' use, consisting, essentially, of sulphate of alumina and water, and free or nearly free from iron, substantially as described.

2. The process herein described of producing directly from any aluminous substance containing iron a porous material for paper-makers' use, consisting, essentially, of sulphate of alumina and water, and free or nearly free from iron, substantially as described.

3. The process herein described of producing directly from any aluminous substance containing iron a porous material for paper-makers' use, consisting, essentially, of sulphate of alumina and water, and free or nearly free from iron, the process consisting, essentially, in first preparing, by the usual methods known to alum-makers, a solution of sulphate of alumina containing iron, then in converting nearly all the iron contained in the aluminous solution into insoluble Prussian blue by means of a slight excess of yellow prussiate of potash, then removing the incidentally-formed soluble Prussian blue and the slight excess of yellow prussiate of potash by means of oxide of zinc or equivalent substance, then freeing the solution of sulphate of alumina from Prussian blue and other insoluble matter by subsidence, filtration, or otherwise, then concentrating the aluminous solution to 65° Baumé, (more or less,) then adding bicarbonate of soda and stirring the same rapidly into the hot viscid sulphate of alumina, and, finally, when sufficiently cool, crushing the porous or vesicular mass into lumps of the desired size, substantially as and for the purpose set forth.

ROBERT A. FISHER.

Witnesses:
HENRY T. DECHERT,
OTIS EGAN.